Figure 1:
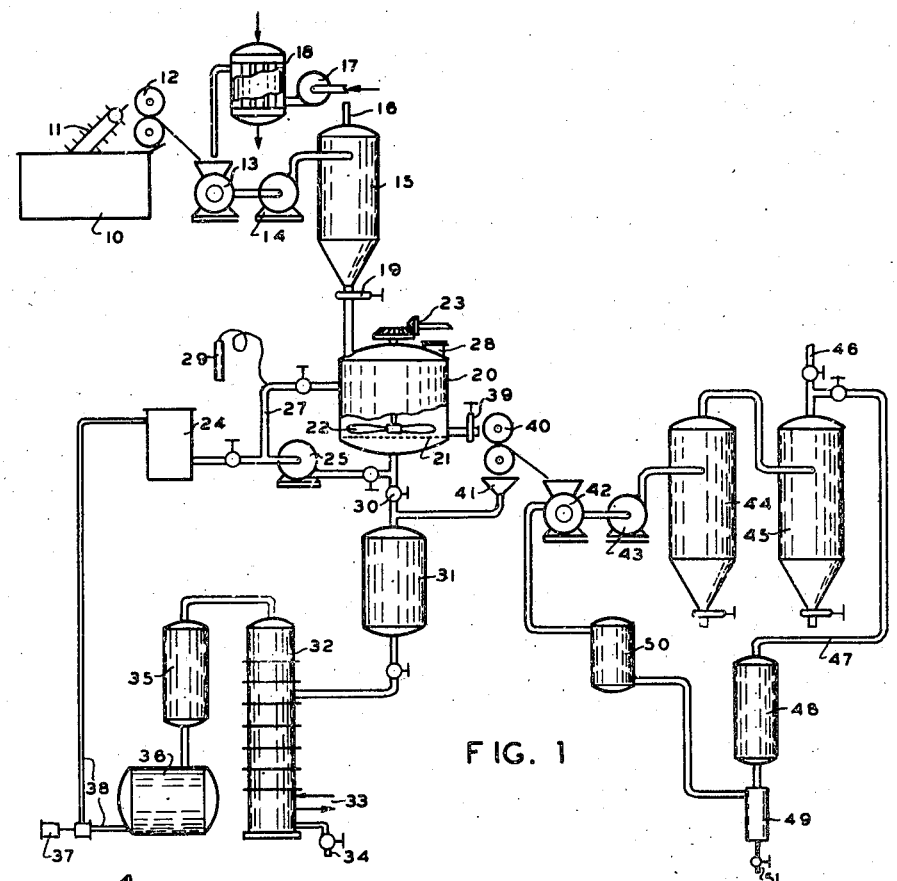

Aug. 2, 1949.   D. E. CLARK ET AL   2,477,861
PRODUCTION OF FIBROUS WATER-SOLUBLE ALGINATES
Filed Nov. 28, 1945

DONALD E. CLARK
ARNOLD B. STEINER
INVENTORS

ATTORNEY

Patented Aug. 2, 1949

2,477,861

UNITED STATES PATENT OFFICE 2,477,861

PRODUCTION OF FIBROUS WATER-SOLUBLE ALGINATES

Donald E. Clark, San Diego, and Arnold B. Steiner, La Jolla, Calif.

Application November 28, 1945, Serial No. 631,355

12 Claims. (Cl. 260—209.6)

This invention relates to the conversion of fibrous alginic acid to a water-soluble salt by a method which maintains the fibrous structure through the steps of conversion and drying.

The objectives of the invention are: to accelerate the combination of the alkaline agent with the acid; to reduce the temperature at which the combination is effected; to reduce the drying time and temperature, and to facilitate or even to avoid the final milling of the product. By these improvements in operating conditions the color of the salt and the clarity, color and viscosity of its aqueous solutions are materially improved, the output of certain parts of the plant is greatly increased, and fuel and power are economized.

The conventional method of producing the water-soluble alginates (such as those of the alkali metals, ammonium and magnesium), as described in the earlier patents, is very briefly as follows. Suitable marine algae are roughly comminuted and washed with water or with dilute acids to remove soluble salts. The washed algae are then cooked with an alkaline solution, usually of sodium carbonate, and the solution of (sodium) alginate thus obtained is filtered to free it from cellulosic residues.

The filtered solution must be extremely dilute (usually about ½ of 1% concentration) by reason of the high viscosity of aqueous alginate solutions, and it is impracticable to evaporate this enormous quantity of water to obtain the dry salt. Further, this solution contains certain salts and sugars which would interfere with subsequent operations and would contaminate the final product. The solution is therefore treated with a dilute mineral acid, by which the water-insoluble free alginic acid is precipitated as a gel containing a somewhat reduced proportion of water and substantially free from these deleterious substances. This gel, after washing with water but without drying, is forcibly blended and worked with an alkaline agent, usually the dry powdered carbonate of the metal of which the salt is desired. Direct combination takes place, with the production of the soluble alginate, and the evolution of carbon dioxide if the alkaline agent is a carbonate. The pasty mass thus obtained is then granulated and dried and is finally milled to a powder of the desired mesh.

A major improvement over this method is described in U. S. Patent 1,814,981 to Thornley & Walsh, this improvement consisting in precipitating the dilute filtered solution with a soluble calcium salt, as insoluble calcium alginate, and thereafter treating the precipitate with dilute hydrochloric acid to remove the calcium and leave a residue of free alginic acid. The advantage of this indirect procedure over the direct precipitation of alginic acid by a mineral acid is found in the greater amenability of the alginic acid to subsequent treatments.

Alginic acid precipitated as such (i. e., by neutralization) occurs in gelatinous masses which hold up large quantities of water and of mineral salts such as sodium chloride. These salts must be washed out to avoid contamination of the final product, and the gelatinous mass is extremely difficult and tedious to wash or even to separate from the mother liquor. But on precipitation of the algin from dilute solution as calcium alginate, under the controlled conditions described in the above named patent, the insoluble alginate is obtained in the form of long threads (so-called fibres) which show no tendency to cohere, which expose extended surfaces to treatment with liquids, and which may be washed, leached and bleached with the greatest facility. This improvement has made possible the economical production of the various algins on a large commercial scale.

The difficulty remains that, even where the Thornley & Walsh method is used, the fibrous form is lost during the combination of the alginic acid with the carbonate or other alkali. This is due to the fact that the acid cannot be brought by pressure to much above 20% to 25% solids (75/80% water), hence there is always enough water present to dissolve the reaction product and form a paste during incorporation. While it is possible to reduce the water content of the acid by predrying, this results in degredation and in incomplete reaction with the alkali.

Once the fibrous form is lost, the water-soluble product forms a stiff mass, which is worked with difficulty and with the expenditure of much power. The major drawback, however, to the present method of combining the dry alkali with alginic acid is found in the extended time and the elevated temperature required for drying the pasty reaction product.

Alginic acid is a polymer consisting of a variable and unknown but undoubtedly great number of anhydro mannuronic acid units, and both the free acid and its salts are subject to depolymerization. This change, by which the viscosity of the solution (at any given concentration) and the color are depreciated, is much accelerated by even a small increase in temperature above the normal, and by mechanical action.

It follows that to obtain soluble alginates of the lightest color and the greatest viscosity in a solution of given concentration it is desirable to dry the salt as rapidly as possible and with the least possible mechanical action and elevation of temperature.

These desiderata have been attained, so far as we are aware for the first time, by the method about to be described and which will be illustrated by comparisons of the final results of the old and the new methods. This method consists, in general terms, of reacting the solid alginic acid with the desired alkaline agent in a liquid medium consisting of water together with a sufficient quantity of an alcohol or its equivalent to prevent solution of the water-soluble alginate as it is formed.

It should be predicated that the proposed method is applicable only to an alginic acid in fibrous form, such as that produced by precipitation of an insoluble alginate of an alkaline-earth or a heavy metal and the subsequent leaching out of the metal with a mineral acid. The gelatinous and massive condition of the alginic acid produced by direct precipitation with a mineral acid prevents the application of the new method to its conversion into soluble salts.

Starting, then, with a supply of fibrous alginic acid such as is produced by the method of Thornley & Walsh and which has been water-washed but not dried, we first pass the solid acid through dewatering presses or between rolls to express as much as possible of the adherent and occluded water. The threads of acid do not cohere under pressure and the acid emerges from the rolls in fragile sheets which are readily reduced to a mass of loose fibres by a light shredding operation, such for example as passage through a fan mill.

The shredded acid is sampled and its contents of water, of actual acid and of inorganic salts (if any) are determined. The acid is then immersed in a bath of a water-miscible, volatile, organic solvent, which may be methyl, ethyl, normal propyl, isopropyl or tertiary butyl alcohol, acetone, methyl ethyl ketone or diethyl ketone. The higher alcohols have too little water miscibility for this purpose. Isopropyl alcohol is particularly adapted to this use because of the ease with which it is recovered and its relatively low cost.

The acid and alcohol are brought together in a vessel provided with stirring means and the calculated quantity of the preferred alkaline agent is added after or with the alcohol. Any of the various organic and inorganic bases which react with alginic acid to form the corresponding water-soluble salts may be used. These comprise the alkaline compounds of the alkali metals and magnesium, ammonium hydroxide or carbonate, the quaternary ammonium bases such as benzyl trimethyl ammonium hydroxide, the alkyl, aryl and alkaryl amines, diamines, triamines and other polyamine compounds, and the heterocyclic bases.

The form in which the alkali is introduced will depend on its nature: sodium, potassium or magnesium carbonate is added as a finely ground, dry powder; the hydroxides of potassium or sodium may be introduced as strong aqueous or alcoholic solutions; ammonia may be added in the form of 28/29% ammonia water, or as a gas into a pressure vessel.

The slurry produced by stirring these components together is kept under gentle agitation until reaction is complete, after which the liquid medium is drained off. An additional alcohol wash may be applied at this point to reduce the water content, though as a rule this is not profitable. In either case the water-soluble alginate, which is still in the original fibrous or thread-like form, is again passed between rolls or run through dewatering presses and the final product is again shredded and dried at a low temperature. The product of this operation is a light, fluffy mass which usually needs no further comminution to fit it for the market.

The successful application of this method requires the observance of certain quantitative relations between the actual (anhydrous and pure) alginic acid and the alkaline reagent, between the volume of liquid medium and the weight of acid, and between the water and alcohol of which this medium is composed.

It is a material advantage of this method over those of the prior art that reaction occurs uniformly throughout the mass of fibre treated, whereas in the paste mixing methods reaction is far from uniform and the product is a mixture of alginates of varying pH value. By reason of the uniformity of reaction in aqueous-alcoholic suspension it is possible, by careful sampling and determination of the content of free acid, to calculate exactly the quantity of any given alkali required to obtain a final product of any desired pH value. In making this calculation, the combining weight of commercial alginic acid is taken at 215.

The quantity of total liquid medium will be such as to produce a slurry of the consistency most readily handled by the stirring apparatus available, the reaction proceeding equally well in a thin or a thick slurry. Ordinarily the water retained in the alginic acid, together with the optimum proportion of added alcohol, will provide sufficient liquid medium. If the stirring arrangements are weak, a further quantity of water with a proportionate further amount of alcohol may be added. The alcohol rapidly extracts water from and shrinks the fibres and, in consequence, the slurry tends to become more fluid during the first few minutes of agitation. As a rule a quantity of liquid equal to about 0.8 gallon per pound of anhydrous acid will suffice, this quantity including the liquid retained in the fibre.

The relation of alcohol to water in the liquid phase is preferably the minimum of alcohol which will prevent any solution of the soluble alginate product in the liquid. In the use of isopropyl alcohol this minimum relation will be of the order of 40 alcohol to 60 water, by volume. Other alcohols or ketones may require slightly more or less of the organic component. More alcohol than the minimum may be used, but without enough advantage to compensate increased cost of recovery and possible increased loss of alcohol. If less alcohol than the minimum be used, a part of the alginate will dissolve as formed, the fibrous structure will disappear, the mass will become pasty and the benefits of the procedure will be lost.

In the use of an unfamiliar solvent, the optimum relation of solvent to water may be determined by blending an aqueous solution of the alginate with measured quantities of solvent and noting the point at which the alginate separates in the form of flocs or curds. The volumetric relation will ordinarily be found to lie between solvent 35:water 65 and solvent 50:water 50.

The following example will illustrate the complete procedure, from the taking of the fibrous acid from the hydrochloric acid wash of the Thornley & Walsh process to the dried and finished product, using a batch method of application.

Example 1

Alginic acid made by the Thornley & Walsh process was shredded as taken from the press rolls, the resulting fibres or threads averaging about 0.005" in diameter and ranging from 1" to 2" or more in length. On sampling and analysis this acid showed the following figures:

| | Percent |
|---|---|
| Water | 79.7 |
| Calcium as CaO | 0.3 |
| Anhydrous alginic acid | 20.0 |

1000 grams of the moist acid was placed in a vessel provided with stirring means and suspended in recovered isopropyl alcohol (the constant boiling mixture, 88% alcohol by weight, 91% by volume). The quantity of this alcohol required to bring the liquid phase to a 40 alcohol:60 water ratio is figured as follows:

1000 grams moist acid contains 797 grams (ml.) water

Absolute alcohol required = 797 ÷ 6 × 4 = 532 ml.

100 volumes 91% alcohol contains 9 volumes water = 15 volumes 40:60 mixture + 85 volumes absolute alcohol 91% alcohol required = 532 ÷ 0.85 = 625 ml.

This quantity of alcohol yielded a rather fluid slurry while if the corresponding quantity of absolute or 99% alcohol had been used the slurry would have been somewhat too thick to be readily workable.

The batch was converted to sodium alginate by the addition of sodium carbonate as a fine, dry powder. The quantity of alkali was calculated as follows:

| | |
|---|---|
| Assumed equivalent weight alginic acid | 215 |
| Combining weight $Na_2CO_3$ | 53 |
| Anhydrous alginic acid, grams | 200 |
| Equivalent sodium carbonate, grams 200 ÷ 215 × 53 = | 49.3 |

The powdered carbonate reacted rapidly with the evolution of carbon dioxide. After ten minutes stirring the liquid phase was substantially neutral. At this point a sample of the fibre dissolved in water to a clear solution, indicating that the acid had been completely converted.

The excess of liquid was then drained from the batch through a wire screen and the fibres of sodium alginate were passed between rolls by which a further quantity of liquid was pressed out. (Both yields of liquid are saved for recovery of the solvent in commercial operation.) The pH of the liquid was about 7.4, the same as that of the alginate fibres. The pressed fibre now showed the following analytical figures:

| | Percent |
|---|---|
| Water | 49.75 |
| Calcium as CaO | 0.25 |
| Sodium alginate, anhydrous | 50.0 |

The fibres of sodium alginate were somewhat reduced in average length by the stirring and were reduced to about half their original diameter by the withdrawal of water by the alcohol.

The press cake of sodium alginate was loosened by separating the fibres, which were then exposed to a current of air at 100° Fahr. Within ten minutes the fibres were apparently dry, but actually retained about 15% water and were practically free from alcohol. At this point the fibres were reduced to a very small diameter, forming a light, fluffy mass of white color, readily soluble in water to give a clear solution. The yield was the theoretical, i. e., 222 gr. on the dry basis.

Example 2

Another sample of commercial alginic acid was reacted with ammonia, the acid showing the following figures:

| | Percent |
|---|---|
| Water | 82.66 |
| Ash | 0.34 |
| Anhydrous alginic acid | 17.00 |

1000 grams of this acid was neutralized with 48 grams of 28% aqueous ammonia, containing

| | Gr. |
|---|---|
| Ammonia ($NH_3$) | 13 |
| Water | 35 |

The total quantity of water was thus 827 + 35 = 862 gr. which was brought to a 40:60 ratio by the addition of 575 ml. absolute isopropyl alcohol.

The suspension was stirred as above described, bringing the pH of the liquid into balance with that of the fibre at 5.5. After draining and pressing the moist fibre showed

| | Per cent |
|---|---|
| Water | 60 |
| Ammonium alginate, anhydrous | 40 |

After drying for one-half hour in air at atmospheric temperature (75° Fahr.) the mass was white, light and fluffy and had a water content of 17%.

Figure 2:
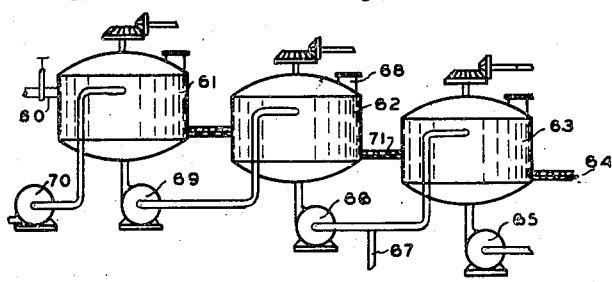

The commercial practice of the invention is illustrated in the accompanying drawings, in which Fig. 1 is a flow-sheet describing a batch process, and Fig. 2 is a diagram illustrating a continuous, countercurrent method of practicing the invention.

Referring first to Fig. 1, 10 represents the alginic acid wash tank of the Thornley & Walsh plant, in which the fibrous alginic acid is given its final water-wash to free it from mineral acid and salts. The fibrous acid is raked up from the tank by a conveyor 11 and delivered to a pair of press rolls 12 by which excess water is squeezed out.

The fragile sheet of moist, fibrous acid passes from the press rolls into a disintegrator or hammer mill 13 by which it is shredded, i. e., the fibres are separated. The individual fibres are rather tough and resilient and as they are not felted and have only slight coherence the sheet is readily broken down. It is important that all aggregations of fibres be resolved in order that the liquid reagent may act on them individually, and the mill provided should have ample capacity for that purpose.

A current of air is drawn through the hammer mill by a fan blower 14, which has itself a useful disintegrating effect and also delivers the mill output into a cyclone or other separator 15 in which the acid is collected, the air being vented at 16. It may at times be desirable to apply a partial drying effect to the acid during shredding, and in such cases the mill may be supplied with a stream of heated air delivered by a fan 17 through a steam heated tubular interchanger 18, or with a warm mixture of air and fire-gases.

The shredded acid is withdrawn from cyclone 15 as required, through a gate 19 into a reactor 20. This element may be any substantially closed tank provided with a false bottom 21 of fine mesh screen and with a stirring means such as paddles 22 revolved by gearing 23. The reactor is supplied with alcohol, or with a mixture of alcohol with the preferred alkaline agent, from a mixing tank 24 by means of a pump 25. It is desirable that this pump discharge into the bottom of the reactor, beneath the false bottom, as at 26.

It is also desirable to provide a cycling connection 27 from an upper part of the reactor to the pump suction, and valves by which the alcohol supply may be shut off while the liquid is being circulated upwardly through the mass of fibres. The exit from the tank into connection 27 should be protected by a screen to avoid the transfer of floating fibres to the space beneath the false bottom.

Solid alkaline reagents in fine powders may be made into a slurry with alcohol in the mixing tank and pumped into the reactor, and reagents soluble in alcohol or other solvent used may be handled in the same manner. Solids or liquids may be introduced into the reactor through manhole 28. Gaseous ammonia may be drawn from a cylinder 29 into the stream circulating through pipe 27 or it may be injected directly into the reactor shell. In no case, however, should the alkaline reagent be contacted with the acid until the latter has been wetted with at least a part and preferably the whole of the alcohol.

Stirring and/or circulation of the liquid are continued until the pH of the liquid phase no longer changes, at which time the pH may be adjusted accurately by slight additions of either acid or alkali. It has been found that the liquid and the fibre come into equilibrium very rapidly, so that determinations of the pH of the liquid may be taken to represent the pH of the product. At the end of the neutralizing reaction the water-soluble alginate remains on the false bottom 21 in the form of a loose layer of fibres.

At this point a drain valve 30 is opened and the free liquid is drawn from the reactor into a diluted alcohol receiving tank 31. From this tank a continuous stream of liquid is drawn into a column still 32 which is supplied with a heating medium at 33 and from which water is drawn at 34. Vapors of alcohol or, preferably, of the constant boiling mixture (azeotrope) are condensed at 35 and collected in an alcohol storage tank 36 from which the supply for the reactor is drawn by a pump 37 and suitable piping 38.

The drained fibre is worked out mechanically through a gate 39 into a pair of high-pressure rolls 40 by which it is reduced to the form of a sheet, the liquid extruded by pressing draining into a tray 41 from which it passes into dilute alcohol tank 31. The sheet of soluble alginate fibres passes over an apron into a disintegrator 42 through which a current of air is drawn by a fan 43. The fan discharges the ground fibre into a cyclone separator 44, in which material of relatively coarse mesh collects, the fines being carried forward into a second cyclone 45 in which they are retained.

The intimate contact with air produced in the mill, fan and cyclone often suffices to reduce the product to a marketable degree of dryness and in such cases the air stream may be vented from the second cyclone at 46. This procedure wastes the alcohol retained by the pressed product, which may be regained by returning the air stream through conduit 47 to the mill 42. In this manipulation the saturated air passes first through a water-cooled or refrigerated condenser 48, a liquid separator 49 and a heater 50 on its way to the mill. By maintaining a moderate temperature difference between the condenser and the heater the alcohol and water content of the moist product may be collected in liquid form in separator 49 and withdrawn at 51 to the alcohol recovery unit.

Referring now to Fig. 2, a stream of the shredded acid such as is collected in cyclone 15 of Fig. 1 is introduced at 60 into a reactor 61 which may be of the general construction of element 20 above described. From this vessel the fibres pass successively through reactors 62 and 63 and are finally withdrawn at 64, passing thence to the dewatering rolls 42 of Fig. 1 and through the subsequent elements of that figure. The fibres should be passed from vessel to vessel and finally out of the last in the series by some mechanical means which will prevent so far as possible the simultaneous passage of liquid. The screw conveyors indicated at 71 are suggested.

A stream of alcohol, preferably without the addition of any alkaline agent, is drawn from a source such as tank 36 of Fig. 1 and delivered by a pump 65 into the bottom of reactor 63. A stream of liquid is drawn from the upper portion of this shell by pump 66 and injected into the bottom of reactor 62, the alkaline agent being introduced into the pump suction as at 67 or being fed by suitable measuring means not shown into manhole 68.

A stream of liquid is withdrawn from the upper part of reactor 62 by pump 69 and fed into the bottom of reactor 61, from which a liquid stream is withdrawn by pump 70 and discharged to a recovery unit, as for example tank 31 and subsequent units of Fig. 1. The suction pipes through which these streams are withdrawn should be provided with screens to exclude fibres from the pumps.

A continuous apparatus is not limited to three shells but it does function in three stages of which these three units are typical. In reactor 63 the completely neutralized fibre is washed with the strongest alcohol to reduce its water contact and to carry any possible unreacted alkali back into the system. In the second stage, represented by reactor 62, the alkaline agent is added and the greater part of the neutralizing reaction occurs. In the third stage, represented by reactor 61, any residual alkali in the liquid leaving the second stage is contacted with fresh acid and completely exhausted, ensuring that no alkali will be carried into the alcohol recovery plant.

The above described method of neutralization of alginic acid, whether applied to batches of the acid or in a continuous manner, has several important advantages over the methods of the prior art.

1. The time and the temperature required for incorporation of the alkaline agent with the alginic acid are materially reduced. In operations on a large commercial scale the comparisons are Time, prior art methods____minutes__ 30 to 90
Time, new method_____do____ 10 to 20
Temperature, prior art methods
°Fahr__ 120 to 140
Temperature, new method_____ Atmospheric 2. The time and the temperature required for drying the water-soluble product are both greatly reduced. In the methods heretofore practiced the minimum liquid content of the reaction paste is about that of the moist alginic acid, of the order of 80% by weight, and this liquid consists solely of water. In the new method the total liquid content of the neutralized fibre is of the order of 50%, of which more or less four-tenths is alcohol or other volatile liquid. Thus, not only is the quantity of water reduced to less than half, but also the presence of the alcohol, which forms an azeotrope of relatively high vapor pressure, ensures the rapid evaporation of this water at a low temperature. For these reasons, the moist product of the new method may be dried rapidly by mere suspension in gently warmed or even cold air whereas the prior art products require a high temperature for an extended time. The comparisons as to drying on a commercial scale are about as follows:

Time, prior art methods_____hours__   1 to 2
Time, new method_____minutes__   5 to 10
Temperature, prior art methods
                    °Fahr__ about 160
Temperature, new method____°Fahr__   60 to 100

3. The colors of the soluble alginates yielded by prior art methods of neutralizing tend to be degraded by the relatively extended times and elevated temperatures above recited, which cause a limited decomposition of the algin by which dark colored bodies are produced. Certain green (alcohol soluble) and brown (water soluble) coloring matters present in the original kelp also are carried in part into the alginic acid and remain in the neutralization paste. The improvement in color produced by reducing time and temperature and by the leaching effect of the dilute alcohol is illustrated by the following comparison of Lovibond colors on samples prepared by the two methods from the same alginic acid, in 4% aqueous solution.

Product of old method_____   1½ red   5 yellow
Product of new method_____   ¾ red    3 yellow 4. The factors which tend to degradation of color also tend strongly to depolymerization of the algin, with consequent reduction in the viscosity of its aqueous solutions. The two samples of which the colors are compared above were also compared as to viscosity by preparing solutions of equal viscosity and comparing the concentrations at which equal viscosity is produced.

In this comparison, an aqueous solution of 1% weight concentration of the product of the new method had a viscosity equal to that of a 1½% solution of the product of the prior art.

5. In the prior art method it is impossible to blend the solid reagent intimately with the paste other than by long continued agitation with resultant degradation of viscosity and color by the extension of time under heat and severe mechanical kneading. As different parts of the batch have different PH values, due to uneven distribution of the alkali, it is impossible to determine the pH of the product until the batch is completed and has been granulated and equalized. In the new method the reaction takes place rapidly and uniformly and as the system reaches equilibrium rapidly the pH of the product may be taken accurately on a grab sample or on the aqueous phase. Thus an error may be corrected by adding more of either component as may be needed, an important advantage in working to close pH specifications.

6. The aqueous solutions yielded by the product of the new process are usually crystal clear, which is in sharp contrast to the behavior of the alginates yielded by the old method. This appears to be due, in large part at least, to the completeness of the reaction between acid and base which in turn is due to the high relation of surface exposure to mass of the thread-like fibres. The product seems to be wholly free from unreacted and insoluble alginic acid, which is usually present in the prior art products.

7. The physical properties of the new product are superior to those of the old. The latter comes from the drier in hard and tough, coarse granules which have to be ground in a hammer mill to reduce them to commercial particle sizes. The new product is light and fluffy and requires little if any grinding to fit it for the market. Because of this difference in physical properties the new product is more readily soluble than that made by present methods.

8. The tendency of the water-soluble alginates to "clump" when mixed with water is largely or entirely overcome by the addition of a minute quantity of borax, as is disclosed in U. S. Patent 2,238,906 to Martell & Schaller. The herein described method strongly facilitates the addition of borate dispersing agents by reason of the fine subdivision of the fibres in the alcohol solution, which enables the borax (solution) to contact all the algin uniformly.

A desirable modification of the new process adapted to the preparation of a readily dispersible, borated algin is to add to the suspension of alginic acid in alcohol a quantity of borax equal to ½% to 1% of the dry weight of acid, together with the alkali required to neutralize the acid. After about ten minutes stirring or circulation the mass of fibres is drained, pressed to about 50% solids and dried in a current of cold air. This product does not clump when mixed with water, even with poor agitation.

9. The new product has better viscosity stability than the prior art product, due to the more uniform and complete combination of the alkali with the acid, ensuring that no free acid groups, subject to rapid deterioration, remain after neutralization. For example, a sodium alginate made by the new process and having an initial Woolwich viscosity of 60 seconds in 1% solution gave a viscosity of 58 seconds in the same concentration after storage for five months. By contrast, a sodium alginate made by the prior art method and having an initial 1% viscosity of 60 seconds gave a viscosity of 36 seconds after storage for the same time. The Woolwich viscosity is the time in seconds required for a $\frac{1}{16}$" steel ball to fall a distance of 15 centimetres through a solution of given concentration maintained at 20° C.

10. By the use of the new process it is possible to prepare in a dry, fibrous condition certain alginates which heretofore have been available only in a pasty or rubbery form. This refers to the reaction products of alginic acid with such organic bases or substituted organic bases as the alkylolamines (e. g., triethanolamine, isopropanolamine), the alkylamines of higher boiling point (butylamine, dibutylamine), the arylamine bases (e. g., aniline), the aralkylamines (e. g., benzylamine) and the heterocyclic bases (example, pyridine).

*Example 3*

1000 grams fibrous alginic acid containing 18% anhydrous acid was shredded and placed in a vessel provided with a mixer. To this was added, with agitation, 125 grams triethanolamine and 320 ml. anhydrous isopropyl alcohol, bringing the alcohol:water ratio to 50:50. This batch was stirred for twenty minutes, drained, pressed in a screw press to 52% solids, shredded and dried at 100° Fahr. for 10 minutes. The product was an apparently dry, fibrous substance devoid of stickiness and resembling an alkali metal alginate prepared in the same manner.

When the reaction product of alginic acid with triethanolamine is prepared in the usual manner, by adding the base to the moist alginic acid, a sticky, pasty mass results which is extremely difficult to handle. This product cannot be dried to yield a dry, granular product but instead assumes a rubbery condition which greatly reduces its utility.

11. The production of alginates of low viscosity is much facilitated by the use of the method herein described. When moist alginic acid of a type which yields low viscosity solutions (for example, 10 seconds Woolwich in 4% solution) is blended with even a solid alkaline agent in the conventional manner, the mass assumes a fluent or "soupy" condition which renders it very difficult to handle through the steps of drying and comminution. This liquid product can be dried only in sheets, as on a drum drier, and the scale thus produced is so hard and tough as to be highly resistant to milling.

These difficulties are avoided in toto by the use of the new process, which retains the algin in the fibrous, solid condition regardless of any tendency to form solutions of low viscosity.

The only additional cost of the new method of neutralizing alginic acid is that due to loss of solvent, which may in large part be offset by savings in fuel and labor charges and is much more than offset by improvement in the quality of the product.

If the reaction product, after pressing to 50% solids, should be dried in the open air following reaction in a liquid medium containing 40% by volume of isopropyl alcohol, the alcohol retained after pressing and lost in drying would amount to about 0.3 pound per pound of commercially dry product. It will be noted that this loss is governed by the retention of alcohol in the reaction product and is substantially independent of the quantity of liquid medium used.

This loss may be avoided by drying the pressed product in a closed system such as that described in connection with Fig. 1, or in a vacuum drier with condenser. It will be understood that the apparatus shown in this figure is intended solely as illustrative of the method, and that such details as the housing of press rolls and other elements to prevent evaporation of solvent are not shown.

In the foregoing description the word "alcohol" is used for convenience to exemplify the water-miscible, nonreactive, volatile solvents above enumerated, and it will be understood that the process is not limited to the use of isopropyl alcohol. This specific solvent, however, is particularly adapted to the purpose by reason of its relatively low cost, its complete stability, and the readiness with which it may be recovered by reason of the formation of a 91% (volume) azeotrope which is sufficiently concentrated for most applications without further dehydration.

We claim as our invention:

1. The method of producing a water-soluble salt of alginic acid in fibrous form which comprises: shredding a moist, initially fibrous form of solid alginic acid to separate the component fibres; forming a slurry of said fibres in a water-miscible, volatile organic liquid in which the desired salt is insoluble, the quantitative relation of said liquid to the water contained in said moist acid being not less than 35:65 volume ratio, and such as to prevent solution of said salt as formed; adding to said slurry substantially the stoichiometric proportion of the base which yields the desired salt; permitting the reaction of said base with said acid to proceed to completion; separating excess liquid from the resultant mass of fibres of the soluble alginate, and drying said fibres.

2. The method of producing a water-soluble salt of alginic acid in fibrous form which comprises: reacting an initially moist fibrous form of solid alginic acid with a base adapted to produce the desired salt, in a medium consisting of water together with at least 35% by volume of the medium of a water-miscible, volatile organic liquid in which said salt is insoluble, the relation of said liquid to water in said medium being not less than the minimum which will prevent the desired salt from passing into aqueous solution; separating excess liquid medium from the resultant mass of fibrous reaction product, and drying said product.

3. The method of producing water-soluble alginates of the alkali metals, in fibrous form which comprises: reacting a fibrous form of solid alginic acid with a base adapted to produce the desired salt in a liquid medium consisting of water together with at least 35% by volume of the medium of a water-miscible, volatile alcohol, the relation of alcohol to water in said medium being not less than the minimum which will prevent the alginic salt from passing into aqueous solution; separating excess liquid from the fibrous reaction product, and drying said product.

4. The method of producing water-soluble alginates of the alkali metals, in fibrous form which comprises: reacting a fibrous form of solid alginic acid with a base adapted to produce the desired salt, in a liquid medium consisting of water together with a water-miscible, volatile organic liquid, said liquid constituting from 35% to 50% of the volume of said liquid medium; draining and pressing excess liquid from the resultant mass of fibres of soluble alginate, and drying said fibres.

5. The method of producing water-soluble alginates of the alkali metals, in fibrous form which comprises: reacting a fibrous form of solid alginic acid with a base adapted to produce the desired salt, in a liquid medium consisting of water together with isopropyl alcohol, said alcohol constituting not less than 35% of the volume of said liquid medium; mechanically separating excess liquid from the resultant mass of fibres of soluble alginate, and drying said fibres.

6. In the conversion of fibrous solid alginic acid to a water-soluble salt, the step of reacting said fibrous acid with a base selected to produce the desired salt, in a liquid medium consisting of water and at least 35% by volume of said medium of a water-miscible, volatile organic liquid to prevent solution of the reaction product and to maintain said product in its original fibrous form, and drying the resulting fibers.

7. In the conversion of fibrous solid alginic acid to a water-soluble salt, the step of reacting said fibrous acid with a base selected to produce the desired salt, in a liquid medium consisting of water and a sufficient quantity of isopropyl alcohol to prevent solution of the reaction product as formed and to maintain said product in substantially the original fibrous form of said acid, said alcohol constituting at least 35% by volume of said medium.

8. The method of maintaining the original physical structure of the fibrous form of alginic acid through a transformation of said acid to a water-soluble salt which comprises the step of reacting said fibrous alginic acid with a base which forms a water-soluble alginate, in a medium consisting of water together with a water-miscible, volatile, organic liquid in which said salt is insoluble, the quantity of said liquid constituting at least 35% by volume of said medium and being sufficient to prevent the water-soluble salt formed by reaction of said acid with said base from passing into aqueous solution.

9. The method of maintaining the original physical structure of the fibrous form of alginic acid through a solid transformation of said acid to a water-soluble salt which comprises the step of simultaneously adding to the fibrous alginic acid a base which forms a water-soluble alginate and a medium comprising essentially water together with a water-miscible, volatile, organic liquid in which said salt is insoluble, the quantity of said liquid being sufficient to prevent the water soluble salt formed by reaction of said acid with said base from passing into aqueous solution, said liquid constituting at least 35% by volume of said medium.

10. The method of maintaining the original physical structure of the fibrous form of alginic acid through a solid transformation of said acid to a water-soluble salt which comprises the step of suspending said acid in a medium consisting of water together with a water-miscible, volatile, organic liquid in which said salt is insoluble, the quantity of said liquid being sufficient to prevent the water-soluble salt subsequently formed by reaction of said acid with a base from passing into aqueous solution, and then adding a base which forms a water-soluble alginate, said liquid constituting at least 35% by volume of said medium.

11. The method of producing water-soluble alginates of organic bases in fibrous form which comprises reacting a fibrous form of alginic acid with an organic base adapted to produce the desired salt in a liquid medium consisting of water together with a water-miscible, volatile, organic liquid, said liquid constituting at least 35% of the volume of said liquid medium, draining and pressing excess liquid from the resultant mass of fibers of soluble alginate and drying said fibers.

12. The method of producing water-soluble alginates of ammonia in fibrous form which comprises reacting a fibrous form of alginic acid with ammonia to produce the desired salt in a liquid medium consisting of water together with a water-miscible, volatile, organic liquid, said liquid constituting at least 35% of the volume of said liquid medium, draining and pressing excess liquid from the resultant mass of fibers of soluble alginate and drying said fibers.

DONALD E. CLARK.
ARNOLD B. STEINER.

REFERENCES CITED

The following references are of record in the file of this patent:

UNITED STATES PATENTS

| Number | Name | Date |
| --- | --- | --- |
| 1,633,262 | Meehan et al. | June 21, 1927 |
| 1,814,981 | Thornley et al. | July 14, 1931 |
| 2,238,906 | Martell et al. | Apr. 22, 1941 |
| 2,319,168 | Speakman | May 11, 1943 |
| 2,403,707 | Cunningham et al. | July 9, 1946 |

OTHER REFERENCES

Stanford, Jour. Soc. of Chem. Ind. (April 29, 1886), page 219.